(12) United States Patent
Hoglund et al.

(10) Patent No.: US 6,721,320 B1
(45) Date of Patent: Apr. 13, 2004

(54) METHOD AND APPARATUS FOR FIBRE CHANNEL IDENTIFICATION AND RETRIEVAL

(75) Inventors: Timothy E. Hoglund, Colorado Springs, CO (US); Louis H. Odenwald, Jr., Wichita, KS (US); Elizabeth G. Rodriguez, Dallas, TX (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/216,400

(22) Filed: Dec. 18, 1998

(51) Int. Cl.⁷ .............................................. H04L 12/28
(52) U.S. Cl. .................. 370/392; 370/394; 370/400
(58) Field of Search ................................ 370/392, 394, 370/400, 401, 402, 403, 404, 398

(56) References Cited

U.S. PATENT DOCUMENTS

| | | | |
|---|---|---|---|
| 5,027,350 A | | 6/1991 | Marshall .................. 370/85.13 |
| 5,095,480 A | * | 3/1992 | Fenner ....................... 370/401 |
| 5,151,897 A | * | 9/1992 | Suzuki ....................... 370/401 |
| 5,151,899 A | | 9/1992 | Thomas et al. ............ 370/94.1 |
| 5,260,933 A | * | 11/1993 | Rouse ........................ 370/216 |
| 5,414,704 A | | 5/1995 | Spinney ....................... 370/60 |
| 5,434,863 A | | 7/1995 | Onishi et al. ............. 370/85.13 |
| 5,473,607 A | * | 12/1995 | Hausman et al. ........... 370/401 |
| 5,490,258 A | | 2/1996 | Fenner ....................... 395/401 |
| 5,588,000 A | | 12/1996 | Rickard ...................... 370/428 |
| 5,592,472 A | | 1/1997 | Grant et al. ................. 370/351 |
| 5,598,541 A | | 1/1997 | Malladi ...................... 395/286 |
| 5,619,497 A | | 4/1997 | Gallagher et al. .......... 370/394 |
| 5,768,530 A | * | 6/1998 | Sandorfi ..................... 709/233 |
| 5,852,607 A | * | 12/1998 | Chin .......................... 370/401 |
| 5,872,822 A | * | 2/1999 | Bennett ...................... 375/372 |
| 5,914,938 A | * | 6/1999 | Brady et al. ................ 370/254 |
| 5,949,786 A | * | 9/1999 | Bellenger ................... 370/401 |
| 6,246,684 B1 | * | 6/2001 | Chapman et al. ........... 370/394 |

* cited by examiner

Primary Examiner—Steven H. D Nguyen
Assistant Examiner—Phuongchau Ba Nguyen
(74) Attorney, Agent, or Firm—Carstens, Yee & Cahoon, LLP (57) ABSTRACT

The invention relates to an improved Fiber Channel data management technique. More specifically, this patent relates to an improved scheme for managing the related data in related frames that form a sequence. This patent also generally relates to the management of multiple, active sequences which are simultaneously in transit on a Fiber Channel. This invention provides a means for efficiently locating the sequence status block associated with an arbitrary Fiber Channel sequence by using the source identifier field, the originator exchange identifier field and/or the sequence identifier fields of a Fiber Channel frame header to construct a hash table lookup search.

5 Claims, 6 Drawing Sheets

```
typedef struct SeqIdentBucket {
    int     BucketValid     : 1,     // '1' if this bucket is Valid
            OxIdValid       : 1,     // '1' requires OX_ID to match for lookup success
            SIdValid        : 1,     // '1' requires S_ID to match for lookup success
            SeqIdValid      : 1,     // '1' requires SEQ_ID to match for lookup success
            Reserved        : 12,    // unused
            OX_ID           : 16;    // OX_ID, must match if OxIdValid set to '1' int     S_ID            : 24,    // S_ID, must match if SIdValid set to '1'
            SEQ_ID          : 8;     // SEQ_ID, must match if SeqIdValid set to '1' struct SeqStatusBlock   *SeqStatusBlock;    // pointer to sequence status block struct SeqIdentBucket   *Next;              // pointer to next bucket } SeqIdentBucket_t;
```

METHOD AND APPARATUS FOR FIBRE CHANNEL IDENTIFICATION AND RETRIEVAL

BACKGROUND OF THE INVENTION

1. Technical Field of the Invention

This invention relates to the field of communication networks and system interconnections between computing and communication devices and instrumentation. More specifically, the invention relates to an improved Fibre Channel data management technique and relates to the management of multiple, active sequences which are simultaneously in transit on a Fibre Channel.

2. Description of Related Art

Local area networks (LANs) are used to connect computers, computer servers, thin clients and peripherals including printers and disk arrays. Through the LAN, the connected devices communicate and transfer data. LANs are widely used, and their performance is adequate for most tasks. However, they do not provide instant access to all data, especially when data is very large and needs to be moved numerous times. LAN performance has evolved slowly over their 20-year history. For example, the increase in throughput for a LAN has been on the order of 10–20 times. In contrast, computing speed in that timeframe has increased a million-fold. The most common LAN today is 10baseT Ethernet, which typically delivers 300 KB/sec. There is, therefore, ongoing development of improved LANs and methods of providing communication between connected devices.

Fibre Channel is the general name given to a set of integrated standards being developed by the American National Standards Institute (ANSI). See for example, X3T9.3 Task Group of ANSI: Fibre Channel Physical and Signaling Interface (FC-PH) Rev. 4.2 Oct. 8, 1993.

Fibre Channel is a campus-wide interconnection standard that is designed primarily to interconnect peripherals, mass storage systems such as redundant arrays of inexpensive disks (RAID), imaging and archiving systems, mainframes, engineering workstations, and other high speed devices. Often seen as the successor to the Small Computer Serial Interface (SCSI) standard, Fibre Channel is a high-speed channel that typically uses fiber optics to interconnect computing devices in a relatively local environment, such as a laboratory or a campus. Thus, the Fibre Channel focuses more on providing bandwidth between devices than a completely flexible network. Fibre Channel is a switched technology. The Fibre Channel interface dedicates circuits for transferring data while allowing other devices to access the channel when it is free. The Fibre Channel interface supports variable length transmissions; it can transmit large blocks of data without dividing the blocks into smaller packets. The speed of Fibre Channel is in the range of 133 Mbit/sec–1062 Mbit/sec. While multimode optical fiber is used most often, single mode optical fiber, coaxial cable, and shielded twisted pair wire are also occasionally used in practice. A promising application area for Fibre Channel is in a Storage Area Network (SAN) such as those used in archives and in the printing and publishing industry. In these applications, latency issues and uneven throughput are less important than video and teleconferencing.

The Fibre Channel interface transports data by reading the buffer information, packaging the data, and sending it across the crossbar switching architecture, or fabric. Underlying data, formats, packet structures or frame types are not important in the switching scheme. While Fibre Channel has its own protocol it also supports FDDI, SCSI, HIPPI and IPI. The flexibility comes in part because Fibre Channel relies on ports logging in with each other and the fabric. This flexibility also leads to support of a wide variety of topologies, including point-to-point, crosspoint switched and arbitrated loops.

The Fibre Channel protocol consists of five layers. FC-0 defines the physical link, including the fiber, the connectors, the transmitters and receivers. FC-1 defines the transmission protocol, including the encoding and decoding rules, special characters and error control. FC-2 is the signaling protocol and is the layer that is the concern of this specification. FC-3 and FC-4 contain advanced features, and mapping rules, respectively.

The signaling protocol (FC-2) level serves as the transport mechanism of Fibre Channel. F-2 defines a frame as a basic building block of a Fibre Channel connection. A frame is the smallest indivisible packet of data that is sent on the link. A frame is at most 2148 bytes. To accommodate longer strings of data, one or more related frames transmitted unidirectionally from one port to another comprise a sequence. In general, this patent relates to an improved scheme for managing the related data in related frames that form a sequence. Further, this patent also generally relates to the management of multiple, active sequences which are simultaneously in transit on a Fibre Channel.

A frame begins with a 4 byte start of frame (SOF) delimiter, followed by a 24 byte frame header, a 0-2112 byte data field (which may include additional optional header information up to a total of 64 bytes), a 4 byte cyclic redundancy check (CRC) error code. The frame ends with a 4 byte end of frame (EOF) delimiter. The 24 byte frame header is made up of a set of control fields which include routing control (R_CTL), destination address or identifier (D_ID), source address or identifier (S_ID), frame type (TYPE), frame control (F_CTL), sequence identifier (SEQ_ID), data field control (DF_CTL), sequence count (SEQ_CNT), originator exchange identifier (OX_ID), responder exchange identifier (RX_ID), and parameter value (PARAM). It is relevant to this invention to note that frames in the same sequence will share have the same S_ID, SEQ_ID and the same OX_ID. The S_ID is 24 bits long, the OX_ID is 16 bits long and the SEQ_ID is 8 bits long.

In order to manage streams of sequences in a Fibre Channel, it is useful to assign a sequence status block to a sequence. This sequence status block contains data that is useful in tracking the status of a sequence that is in transit. Examples of data commonly found in sequence status blocks include the OX_ID, the lowest sequence count, the highest sequence count, the sequence count of the last frame received. From the data in the sequence status block calculations can be made to determine sequence completion status, sequence error status, and the association of sequence data to data buffers (typically specified via a DMA buffer list).

A hash table look-up method is often used to organize and retrieve data in memory. The hash table look-up method applies an algorithm to the data that needs to be stored in memory in order to define the table location or position of the hash table into which this selected data is written. To retrieve the data, the hash algorithm is applied to the search item. It is not uncommon for a hash algorithm to produce an event termed "a collision." Collisions occur when items hash to the same location in the table. In the art, these are called synonyms. In the event of a collision, the synonym is placed elsewhere. This is achieved by probing a second time, searching a series of table locations until an empty one is found. Similarly, on retrieval, a process of secondary probing is employed to access the table location in the event that the first location contains an entry for a different address.

Most hashing techniques use one or more common randomizing functions, or some variation thereon. For an example, one randomizing function involves taking the remainder of the ratio of the key to a prime number. The role of the randomizing function is to compress the key field into a much smaller integer index into the hash table. The technique is more effective for keys that vary widely, because in these instances, there is more randomization and fewer collisions. As a consequence the least significant bits of a reference are often used in practice as the key. Hashing functions are typically viewed as one-way randomized mappings of the key set into the hash space. In fact, hashing is often used in data encryption for security applications since the index computed by the hashing function can not be used to reconstruct the key.

Locating a sequence status block is currently accomplished with a 48-bit index. To construct a simple index for locating an associated sequence status block would require an index of 48 bits which renders it impractical as a lookup mechanism.

Therefore it would be advantageous to have a means of efficiently locating the sequence status block which is associated with an arbitrary Fibre Channel sequence.

SUMMARY OF THE INVENTION

The present invention has been achieved in order to overcome the foregoing problems, and allow the efficient management of streams of Fibre Channel sequences that contain multiple data frames. It is the object of the present invention to provide for an improved Fibre Channel sequence management system.

A mapping of Fibre Channel header information to associated sequence status information is required for Fibre Channel sequence management whereby certain fields of the Fibre Channel header uniquely identify a sequence. Certain protocols and/or profiles for Fibre Channel ease the mapping of header information to sequence status information by allowing both the sending agent and the receiving agent to select and maintain a unique identification tag that is valid throughout the set of sequences associated with a Fibre Channel exchange, or other, operation.

Unfortunately, other protocols and/or profiles for Fibre Channel operation do not allow for simple mapping of Fibre Channel header information to sequence status information. It is for this case that the invention described herein is effective in achieving the same.

This invention provides an apparatus and method for efficiently locating the sequence status block that is associated with an arbitrary Fibre Channel sequence.

BRIEF DESCRIPTION OF THE DRAWINGS

The present invention and its features and advantages, herein described or otherwise apparent, may be better understood by reference to the following description in conjunction with the appended drawings, which drawings form a part of this specification. It is noted, however, that the appended drawings illustrate only exemplary embodiments of the invention and are therefore not to be considered limiting of its scope.

DETAILED DESCRIPTION OF THE DRAWINGS

Figure 1:
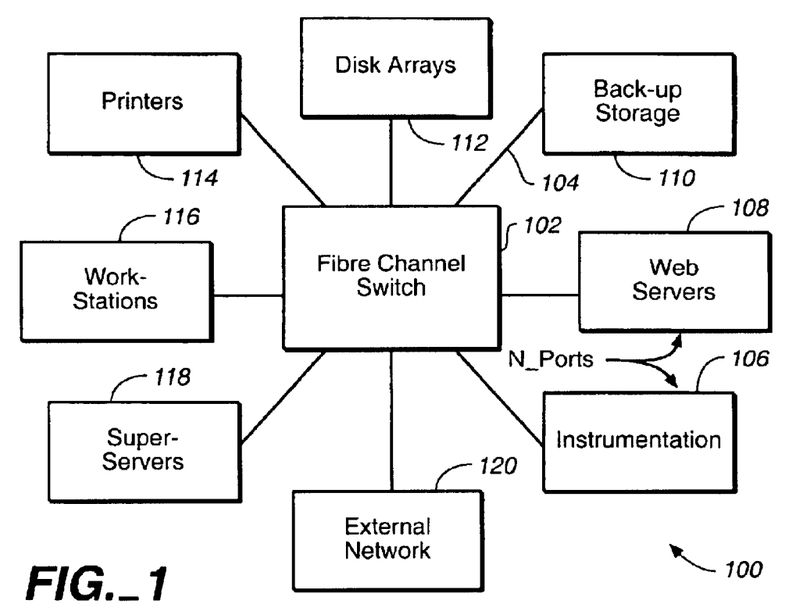
FIG. 1 is a schematic view of a fibre channel in a switched configuration.

Referring to FIG. 1 is a schematic view of a Fibre Channel switching fabric configured in a switched configuration 100. This is a particularly relevant configuration for a preferred embodiment of the invention disclosed herein, although this prior art is shown here only for example. FIG. 1 shows a central Fibre Channel switch 102 that controls channels 104, or links between the N_Port devices 106, 108, 110, 112, 114, 116, 118, and 120. Examples of N_Port devices, include instrumentation 106, web servers 108, back-up storage 110, and disk arrays 112, which may include RAIDs (redundant arrays of inexpensive disks) or JBODs (Just a Bunch of Disks), printers 114, workstations 116, and super-servers 118. The versatility of Fibre Channel further allows standard connections to external networks 120, including outside communications and computer networks. Thus, as is relevant to this invention, the fibre channel protocol must support communication links using network protocols with unsolicited data arriving. This arriving data must be managed and resources must be assigned in a contemporaneous manner. The context of the arriving data must be managed in an efficient manner based on the relevant information contained in the frame header. This invention teaches an apparatus and method for efficiently managing the context of these Fibre Channel frames.

Figure 2:
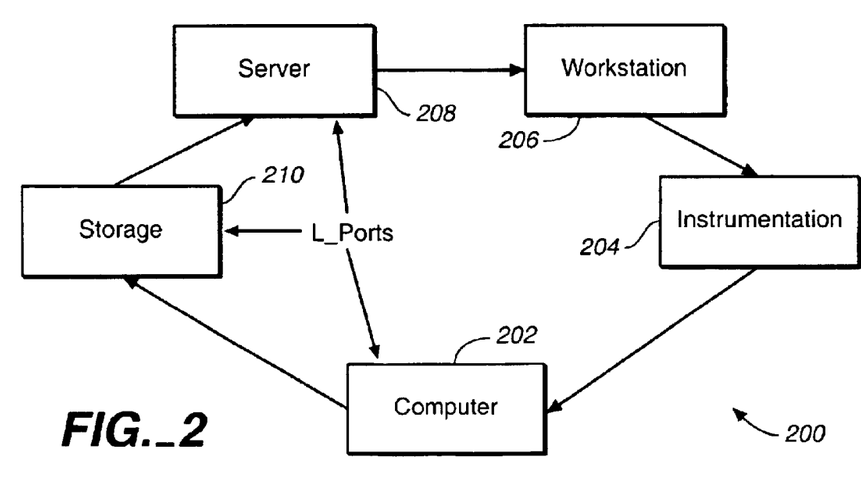
FIG. 2 is a schematic view of a fibre channel in an articulated loop configuration.

FIG. 2 shows a Fibre Channel loop architecture 200, in which the routing and linking between, and in some cases among, devices is governed by the L_port devices 202, 204, 206, 208 and 210. Examples of the L_Port devices include the same set of devices as the N_Port devices. By example and without limitation are shown in FIG. 2 computer 202, instrumentation 204, workstation 206, server 208, and storage devices 210. Thus, as is relevant to this invention, the fibre channel protocol must support communication links using network protocols with unsolicited data arriving. This arriving data must be managed and resources must be assigned in a contemporaneous manner. The context of the arriving data must be managed in an efficient manner based on the relevant information contained in the frame header. This invention teaches an apparatus and method for efficiently managing the context of these Fibre Channel frames.

As will be obvious to those skilled in the art, actual networks in practice will be complicated combinations of these basic architectures. In these hybrid situations too, arise the need for efficient Fibre Channel context identification and retrieval to which this invention applies.

Figure 3:
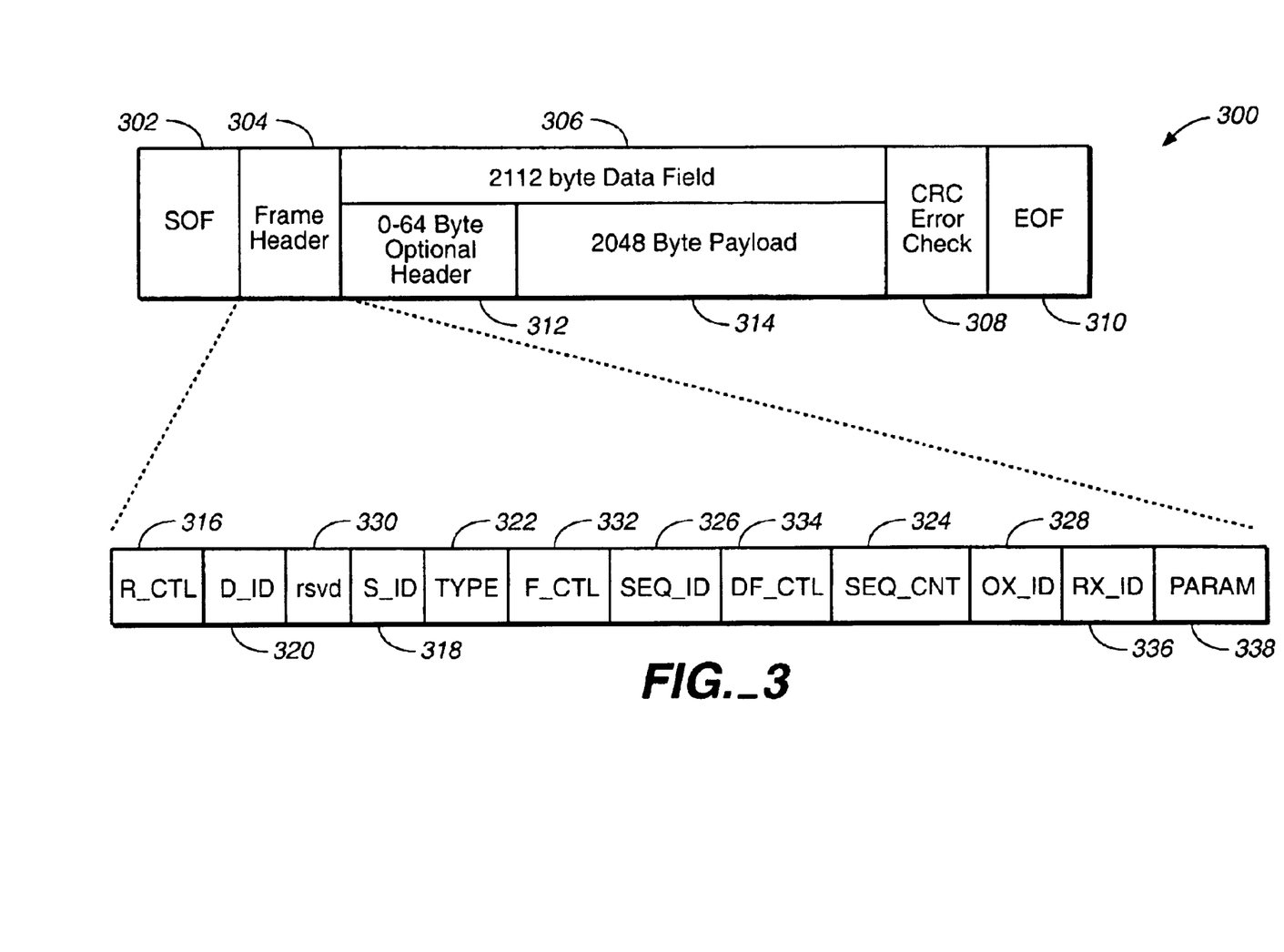
FIG. 3 is a block view of the organizational structure of a fibre channel frame.

FIG. 3 illustrates a block view of the exemplary organizational structure of a typical Fibre Channel frame 300. The basic building blocks of a Fibre Channel connection are the frames. By way of example and without limitation, a typical frame begins with a 4-byte code signifying the Start of Frame (SOF) 302. Following the SOF is the Frame Header 304, followed by the 0-2112 byte Data Field 306, followed by a 4-byte Cyclic Redundancy Check (CRC) 308 and a 4-byte End of Frame (EOF) code 310. Thus individual frames contain both the data payload and the overhead information for delimiting frames, handshaking, addressing and routing, and error checking. The data field may include additional optional header information 312 up to a total of 64 bytes in addition to a 2048-byte payload 314. The frame header 304 is used to control link applications, control device protocol transfers and provide data to detect missing or out-of-order Frames. The frame header 304 therefore may be comprised of an 8-bit routing control field (R_CTL) 316, a 24-bit destination address (D_ID) 320, an 8-bit reserved field (rsvd) 330, a 24-bit source address (S_ID) 318, an 8-bit type field (TYPE) 322, a 24-bit control frame field (F_CTL) 332, an 8-bit sequence identifier (SEQ_ID) 326, an 8-bit data field control field (DF_CTL) 334, a 16-bit sequence count value (SEQ_CNT) 324, a 16-bit originator exchange identifier (OX_ID) 328, a 16-bit responder exchange identifier (RX_ID) 336, and a 32-bit parameter value (PARAM) 338.

Figure 4:
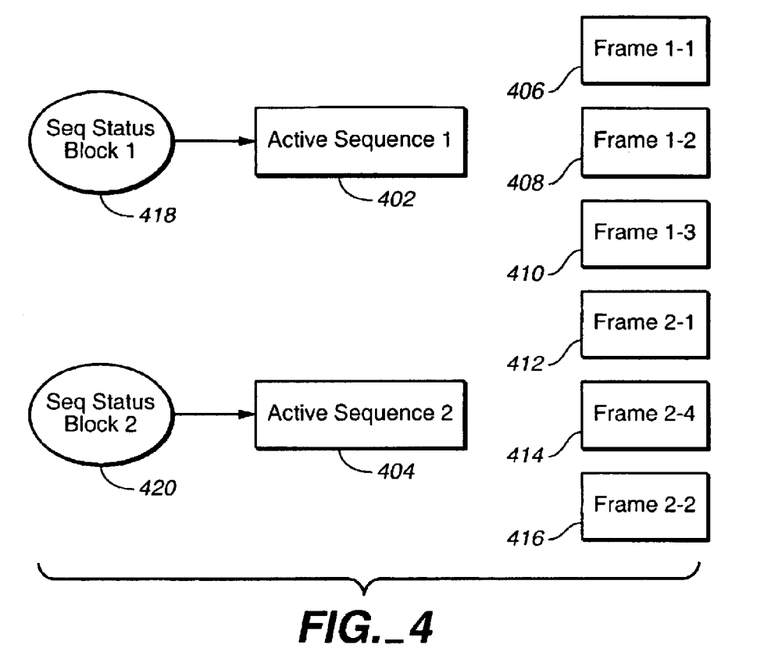
FIG. 4 is a schematic view showing active sequences made up of incoming frames.

Individual frames combine together to form sequences. Sequences in which data is still incoming, and are thus still actively in transmission are termed active sequences. Referring now to FIG. 4 is a schematic view of two active sequences, active sequence 1 (402) and active sequence 2 (404). Active sequence 1 is comprised of three frames 406, 408, and 410. In the figure these three frames are numbered in accordance to their SEQ_ID and their SEQ_CNT. It may be noted that these frames have arrived in order. Active sequence 2 is also comprised of three frames 412, 414, and 416. In the figure these three frames are numbered in accordance to their SEQ_ID and their SEQ_CNT. It may be noted that these frames have not arrived in order, and it may further be noted that at least one frame has not arrived. In other words, Frame 2-4 (414) arrived before Frame 2-2 (416), and Frame 2-3 has not arrived at all. Associated with active sequence 1 is a sequence status block 1 (418). Associated with active sequence 2 is a sequence status block 2 (420).

When an incoming frame arrives, it must be placed in a memory at a trackable memory location. Further, other data management algorithms must be run in order to track active sequences. Often, this data management and Fibre Channel context identification and retrieval is facilitated by a sequence status block that can contain such information as the OX_ID, the lowest sequence count, the highest sequence count, the sequence count of the last frame received. From the data in the sequence status block, calculations can be made to determine sequence completion status, sequence error status, and the association of sequence data to data buffers (typically specified via a DMA buffer list).

The present invention teaches an apparatus and method to efficiently locate a sequence status block. A sequence status block is uniquely defined by its SEQ_ID, S_ID and OX_ID. The total bit count for these three tags is 48. Rather than use all 48 bits a better strategy is, in accordance to this invention, to use the SEQ_ID as the initial key to a hash table look-up algorithm. The 8 bit SEQ_ID allows for the required 256 states allowable by Fibre Channel protocol. Further, of the three tags, SEQ_ID, S_ID, and OX_ID, the SEQ_ID is the tag most likely to widely vary among the active sequences, and hash table look-up schemes are most effective when widely varying keys are chosen.

In a preferred embodiment, a table is constructed which may be in either on-chip or off-chip memory. This table contains 256 elements. Each element represents a start-of-list pointer to a set of sequence identifiers that share a common SEQ_ID in the range of $0 \leq SEQ\_ID \leq 255$. Should no sequences be active for a given SEQ_ID, the start-of-list pointer will be set to NULL. On the other hand, if there are active sequences, the start-of list pointer will be non-NULL and will point to the first of several sequence identifier buckets for the associated SEQ_ID.

Each sequence identifier bucket contains the following information which is used to test for sequence look-up success or failure: (1) a valid bit; (2) three field validity bits, which specify whether to compare or to ignore the OX_ID, the S_ID and the SEQ_ID respectively, when testing for look-up success or failure; (3) the OX_ID; (4) the S_ID; (5) the SEQ_ID; (6) the pointer to the actual sequence status block; and (7) the pointer to the next hash table bucket for this SEQ_ID.

After finding the start-of-list pointer for a given SEQ_ID the entity responsible for locating sequence status blocks walks the linked list of sequence identification buckets, returning the start-of-list pointer to the actual sequence status block if a suitable match is found. If no suitable match is found, then a NULL value is returned which indicates look-up failure.

In an alternate embodiment, the 256-element start-of list pointer table is based upon the least significant 8 bits of the OX_ID.

In yet another embodiment, the 256-element start-of list pointer table is based upon the least significant 8 bits of the S_ID.

Figure 5:
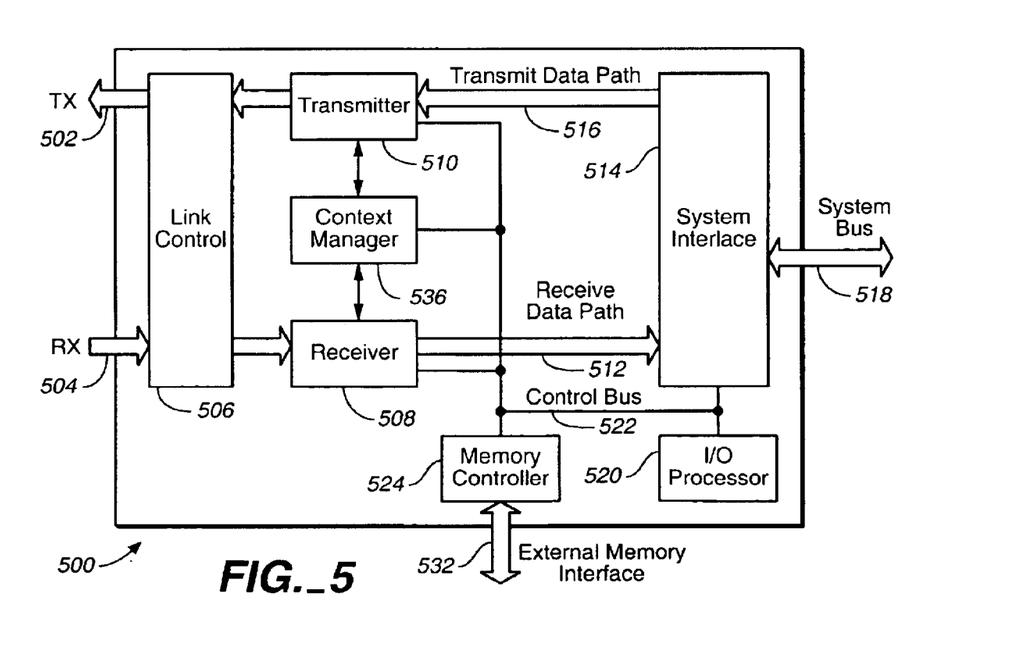
FIG. 5 is a schematic view of a preferred embodiment of an apparatus for efficiently locating the sequence status block that is associated with an arbitrary Fibre Channel sequence.

FIG. 5 is a schematic view of a preferred embodiment of an apparatus for efficiently locating the sequence status block that is associated with an arbitrary Fibre Channel sequence. The figure shows the important functional building blocks along with the interconnections. Input receiving lines 504 and output transmission lines 502 are operationally connected to a link control 506. The link control 506, is operationally connected to receiver logic 508 and to transmission logic 510. The Receiver Logic Block 508 and the transmission logic 510, are operationally connected to a Context Manager 536. Likewise, both are also operationally connected to a System Interface 514 by a transmit data path 516 and a receive data path 512. The System Interface 514 is operationally connected to an external PCI 518. The System Interface 514 is also operationally coupled to an input/output processor (IOP) 520. The IOP 520 is operationally coupled by a Control Bus, 522 to a memory controller 524. The memory controller, 524, is also connected to an External Memory Interface, 532.

In the present invention, a Fibre Channel frame flows into the apparatus through Input Receiving line 504. The Link Control recovers and routes the signal to the Receiver Logic Block 508. It is in this logic that the Frame Header is read, and the S_ID, OX_ID and SEQ_ID are recorded. The chosen identifier, in one preferred embodiment, the SEQ_

ID, is hashed and used as the initial, start-of-list pointer in the look-up routine. In the logic, the identifiers are tested for validity and for a match with an active frame. The Context Manager 536 implements the hash-table lookup.

Figure 6:
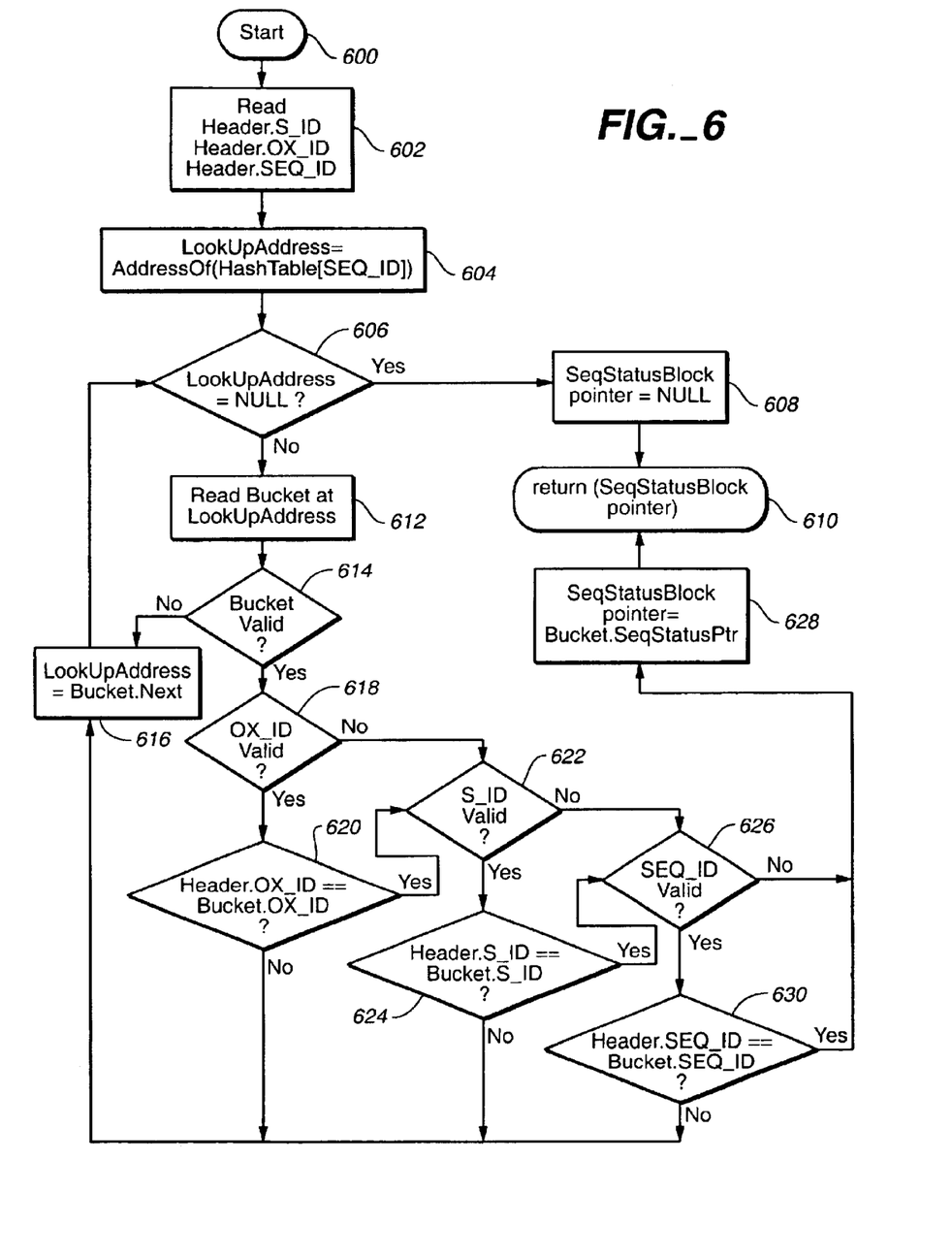
FIG. 6 shows a flowchart of an illustrative embodiment of a method for efficiently locating the sequence status block that is associated with an arbitrary Fibre Channel sequence.

FIG. 6 shows a flowchart of an illustrative embodiment of a method for efficiently locating the sequence status block that is associated with an arbitrary Fibre Channel sequence. The method begins at step 600 that corresponds to receiving a frame from a Fibre Channel. Step 602 entails reading the three tags, SEQ_ID, S_ID, and OX_ID from the header in the frame. Step 604 entails setting the LookUpAddress flag based on the hash of the SEQ_ID. In an alternate embodiment, the least significant bits of the S_ID would be used to set the LookUpAddress in this step. In still another embodiment the least significant bits of the OX_ID would be used to set the LookUpAddress in this step.

Proceeding now to step 606, a branching of the flowchart is made based on the value of LookUpAddress. If the value of LookUpAddress is Null, then SeqStatusBlock is set equal to null in step 608, and the logic flow returns the SeqStatusBlock pointer in step 610. If the value of LookUpAddress is not NULL, then the logic flow proceeds to step 612, wherein the bucket at the LookUpAddress is read. The decision point, 614 tests the validity of the bucket. If the bucket is not valid then the LookUpAddress tag increments to the next bucket, in step 616. From step 616, the logic flow proceeds to step 606.

Alternatively, If the bucket is valid in step 614, then the logic tests the validity of the OX_ID in step 618. If the OX_ID is valid, then the OX_ID in the header is compared to the OX_ID in the bucket, in step 620. According to the logic flow, if the result of step 620 is a NO, then the flow returns to step 616, and thence 606.

If there is a match between the OX_ID in the header, and the OX_ID in the bucket, in step 620, then the logic flow proceeds to step 622 wherein the S_ID is tested for validity. If the S_ID is valid, then the logic flow proceeds to step 624 wherein the S_ID in the header is compared to the S_ID in the bucket. According to the logic flow, if the result of step 624 is a NO, then the flow returns to step 616, and thence 606.

If there is a match between the S_ID in the header and the S_ID in the bucket in step 624 then the logic flow proceeds to step 626, wherein the SEQ_ID is tested for validity. If the SEQ_ID is not valid then the logic flow proceeds to step 628 wherein the SeqStatusBlock pointer is set equal to the Bucket SeqStatus pointer. Step 628 leads to step 610 wherein the logic flow returns the SeqStatusBlock pointer.

Alternatively, if the SEQ_ID is valid, then the logic flow proceeds to step 630 wherein the SEQ_ID in the header is compared to the SEQ_ID in the bucket. According to the logic flow, if the result of step 630 is a NO, then the flow returns to step 616, and thence 606.

If there is a match between the SEQ_ID in the header and the SEQ_ID in the bucket in step 630 then the logic flow proceeds to step 628 wherein the SeqStatusBlock pointer is set equal to the Bucket SeqStatus pointer. Step 628 leads to step 610 wherein the logic flow returns the SeqStatusBlock pointer.

It may be noted that the flow control in FIG. 6 is representative, and indicates one example of a preferred embodiment. It will be clear to someone skilled in the art that certain steps may be arranged differently. For example, the S_ID may be tested for validity and matching before the OX_ID. Alternatively, all three of the validity tests may be checked first before the matching tests.

Figure 7:
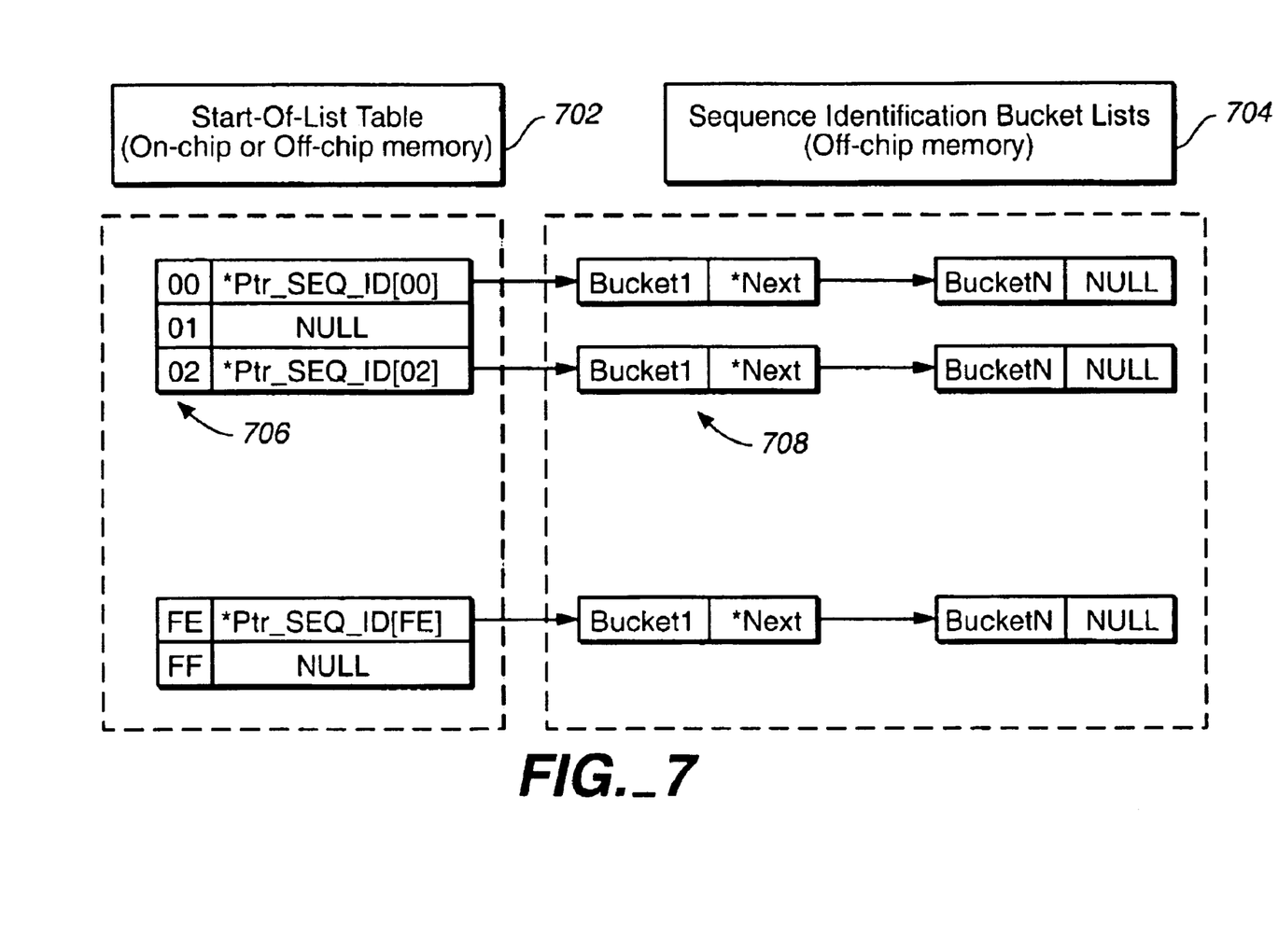
FIG. 7 shows a diagram of start-of-list table and sequence identification bucket lists in accordance with an embodiment of an apparatus and method for efficiently locating the sequence status block that is associated with an arbitrary Fibre Channel sequence.

FIG. 7 shows a diagram of start-of-list table and sequence identification bucket lists in accordance with an embodiment of an apparatus and method for efficiently locating the sequence status block that is associated with an arbitrary Fibre Channel sequence. Shown in this figure is the relationship between a Start-of-List table 702, and a set of Sequence Identification Bucket Lists 704. The Start-of-List table 702 is made up of a set of Start_of_List Pointers 706. The Start_of_List Pointers 706, point to a set of sequence identifier buckets 708. A table is constructed which may be located in either on-chip or off-chip memory. This table contains 256 elements. Each element represents start-of-list pointers to a set of sequence identifiers that share a common identifier, for example, the SEQ_ID in the range of $0 \leq SEQ\_ID \leq 256$. Should no sequences be active for a given identifier, for example, the SEQ_ID, the start-of-list pointer will be set to NULL. On the other hand, if there are active sequences, the start-of-list pointer will be non-NULL and point to the first of X sequence identifier buckets for the associated SEQ_ID.

Each sequence identifier bucket contains the following information which is used to test for sequence look-up success or failure: a valid bit; three field validity bits, which specify whether to compare or to ignore the OX_ID, the S_ID and the SEQ_ID respectively, when testing for look-up success or failure; the OX_ID; the S_ID; the SEQ_ID; (6) the pointer to the actual sequence status block; and the pointer to the next hash table bucket for this identifier, for example, the SEQ_ID.

After finding the start-of-list pointer for a given identifier, for example, the SEQ_ID, the entity responsible for locating sequence status blocks walks the linked list of sequence identification buckets, returning the start-of-list pointer to the actual sequence status block if a suitable match is found. If no suitable match is found, then a NULL value is returned which indicates look-up failure.

In an alternate embodiment, the 256-element start-of list pointer table is based upon the least significant 8 bits of the OX_ID.

In yet another embodiment, the 256-element start-of list pointer table is based upon the least significant 8 bits of the S_ID.

Figure 8:
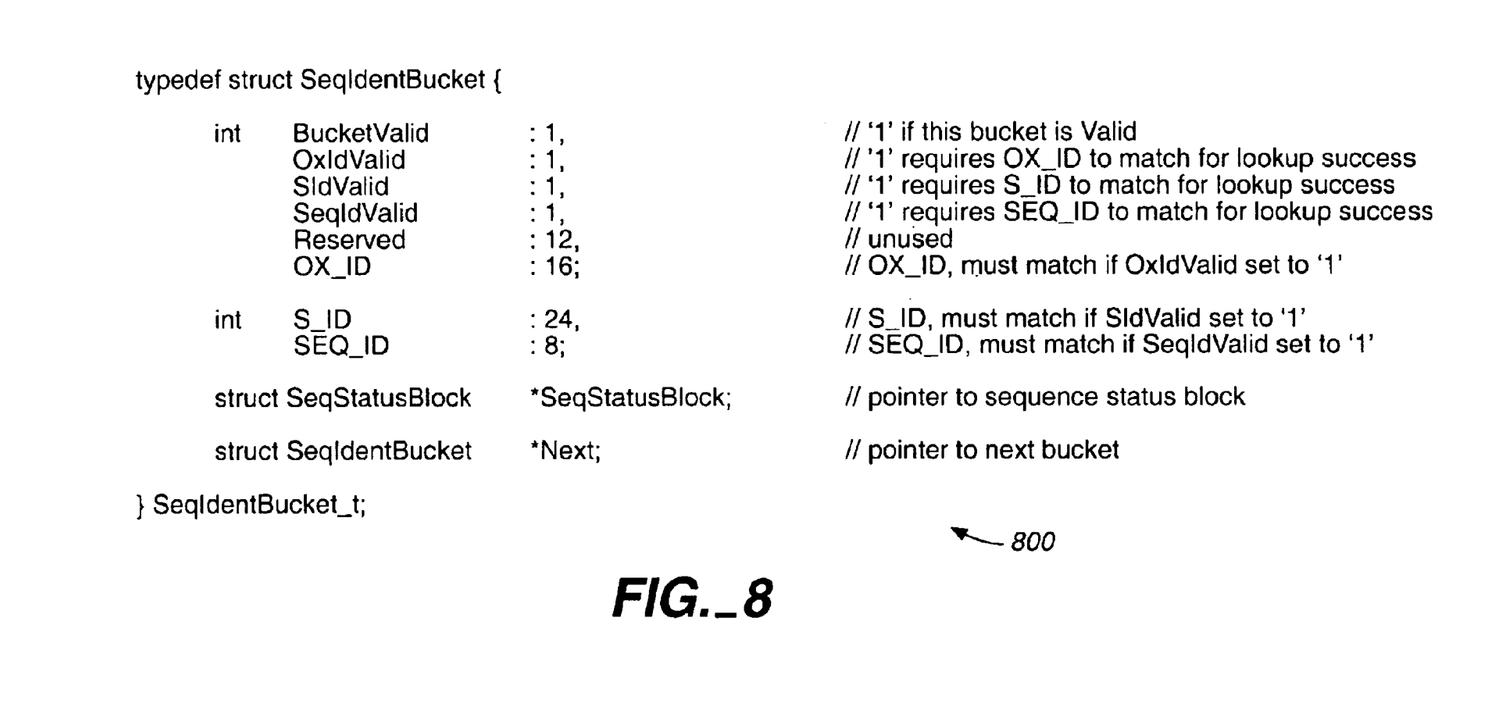
FIG. 8 shows the data structure written in C programming language for the bucket format in an embodiment of an apparatus and method for efficiently locating the sequence status block that is associated with an arbitrary Fibre Channel sequence.

FIG. 8 shows the data structure written in C programming language 800 for the bucket format in an embodiment of an apparatus and method for efficiently locating the sequence status block that is associated with an arbitrary Fibre Channel sequence.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. An apparatus for locating a sequence status block of a Fibre Channel sequence, said apparatus comprising:

(a) a link control module for receiving a plurality of Fibre Channel signals containing the Fibre Channel sequence; and (b) a receiver logic module for reading a chosen identifier in a frame header of the received Fibre Channel signals, testing validity of the chosen identifier in the frame header of the received Fibre Channel signals, and for hashing the chosen identifier to create a Start-of-list pointer.

2. The apparatus of claim 1 wherein the chosen identifier comprise a sequence identifier.

3. The apparatus of claim 1 wherein the chosen identifier comprises a source identifier.

4. The apparatus of claim 1 wherein the chosen identifier comprises a originator exchange identifier.

5. The apparatus of claim 1 further comprising logic to compare the source identifier, sequence identifier, and originator exchange identifier of the frame header of the received Fibre Channel signals, with the source identifier, sequence identifier, and originator exchange identifier of frame headers in previously received active sequences.

* * * * *